3,296,304
PROCESS FOR THE PREPARATION OF 2,2-DIARYL-N,N-DISUBSTITUTED ACETAMIDES
James N. Tilley, Cheshire, and Adnan A. R. Sayigh, North Haven, Conn., assignors to The Upjohn Company, Kalamazoo, Mich., a corporation of Delaware
No Drawing. Filed Dec. 19, 1963, Ser. No. 331,948
26 Claims. (Cl. 260—558)

This invention relates to a novel process for producing organic compounds. In particular, this invention relates to a novel process for producing 2,2-diaryl-N-substituted-acetamides and 2,2-diaryl-N,N-disubstituted-acetamides.

2,2-diaryl-N-substituted-acetamides and 2,2-diaryl-N,N-disubstituted-acetamides are known in the art and are useful for a variety of purposes. For example, they are known to be useful as herbicides, e.g., Chem. Ind. (London) 552-3 (1961); as larvicides, e.g., Chemical Abstracts 43, 1144 (1949); and as chemical intermediates for the production of compounds with useful therapeutic properties, e.g., U.S. Patent 2,009,144. The prior art methods for producing these compounds, e.g., Ann. Chem. 356, 81–6 (1907); Chemical Abstracts 54, 17157–8 (1960); J. Am. Chem. Soc. 74, 763–5 (1952); Swiss Patent 184,-987, and German Patent 683,801; are not suitable for economical, large scale production.

The novel process of this invention comprises heating a mixture comprising a primary or a secondary amine, a member selected from the group consisting of 1,1-diaryl-2,2,2-trihaloethanes and 1,1-diaryl-2,2-dihaloethylenes, and a base selected from the group consisting of quaternary ammonium hydroxides, alkali metal hydroxides, and alcoholates of alkali metals, alkaline earth metals, and aluminum. Use of a primary amine leads to a 2,2-diaryl-N-substituted-acetamide; use of a secondary amine leads to a 2,2-diaryl-N,N-disubstituted-acetamide. Although ammonia can be used in place of the primary or secondary amine, the primary amide which results thereby is likely to be transformed to the corresponding nitrile at the preferred reaction temperature.

2,2-diarylacetamides can be produced by the novel process of this invention from either 1,1-diaryl-2,2,2-trihaloethanes or 1,1,-diaryl-2,2-dihaloethylenes. It is thought that trihaloethanes are transformed during the reaction to corresponding dihaloethylenes rather than directing to amides. However, the novel process of this invention is not to be construed as being limited by this postulate, and 2,2-diarylacetamides may actually be produced from the stated mixtures of reactants by one or more other reaction paths.

In defining the novel process of this invention, the term aryl includes unsubstituted and substituted organic moieties which have substantial aromatic character, for example, as discussed by Royals in "Advanced Organic Chemistry," Prentice-Hall, Inc., New York, chapter 5 (1954). Examples of unsubstituted aryl are phenyl, 1-naphthyl, 2-naphthyl, and the isomeric forms of diphenylyl, terphenylyl, phenanthryl, anthryl, furyl, thienyl, pyridyl, quinolyl, and the like. A large variety of substituents can be present on these examplary moieties and substituted moieties are included in the term aryl. Examples of such substituents are alkyl, e.g., methyl, ethyl, butyl, hexyl, decyl; alkenyl, e.g., vinyl, allyl, crotyl, 5-hexenyl; alkoxy, e.g., methoxy, ethoxy, isopropoxy, pentyloxy; halogen, e.g., fluorine and chlorine; alkylthio, e.g., methylthio, isobutylthio, heptylthio; and the like. One or more than one substituent can be present on aryl moiety and, when more than one is present, the substituents can be alike or different. The two aryl moieties in each 1,1-diaryl-2,2,2-trihaloethane or 1,1-diaryl-2,2-dihaloethylene reactant can be alike or different.

It is preferred that an aryl moiety not contain substituents reactive with the base used as a reactant in the novel process of this invention. For example, it is likely that an alkoxy-carbonyl or a cyano substituent would be transformed to a carboxylate salt substituent by reaction with the base. As will be apparent to those skilled in the art, however, an amide will usually be produced even when base-reactive substituents are present if sufficient additional base is present in the reaction mixture.

Especially preferred as aryl moieties in 1,1-diaryl-2,2,2-trihaloethanes and 1,1-diaryl-2,2-dihaloethylenes are phnyl, alkylphenyl, and halophenyl. Examples of alkylphenyl are the isomeric forms of tolyl, xylyl, ethylphenyl, isopropylphenyl, trimethylphenyl, and the like. Examples of halophenyl are the isomeric forms of fluorophenyl, chlorophenyl, dichlorophenyl, trichlorophenyl, and the like.

Substantially all primary and secondary amines can be used in the novel process of this invention. For example, the amine can be entirely aliphatic, i.e., free of ring moieties, or it can be, at least in part, alicyclic, aromatic, heterocyclic, or any combination of these. The amine reactant can contain a plurality of primary and/or secondary amino moieties, and one or more than one of the amino moieties in such a reactant can enter into the novel process of this invention. The only limitations with regard to the suitability of an amine are that the amine be at least as basic as water and that it not undergo gross decomposition during the relatively mild thermal and basic conditions of the novel process of this invention. By the term "gross decomposition" is meant deep-seated structural change involving substantially complete breakdown of the amine into substantially smaller molecular and/or atomic fragments. As will be apparent to those skilled in the art, the vast majority of primary and secondary amines satisfy those two criteria.

Although the halogen in the 1,1-diaryl-2,2,2-trihaloethane of 1,1-diaryl-2,2-dihaloethylene can be fluorine, chlorine, bromine, or iodine, 1,1-diaryl-2,2,2-trichloroethanes and 1,1-diaryl-2,2-dichloroethylenes are preferred because they are the least expensive to produce and because they are usually of particularly suitable reactivity in the novel process of this invention.

With regard to the base used in the novel process of this invention, examples of quaternary ammonium hydroxides are tetramethylammonium hydroxide, tetraethylammonium hydroxide, tetrabutylammonium hydroxide, benzyltrimethylammonium hydroxide, and the like. Alkali metals includes lithium, sodium, and potassium. Alkaline earth metals include magnesium, calcium, strontium, and barium. Preferred alcoholates are those derived from lower alkanols, e.g., methanol, ethanol, propanol, isopropyl alcohol, tertiary butanol, and the like; lower alkylene glycols, e.g., ethylene glycol, propylene glycol, trimethylene glycol, tetramethylene glycol, hexamethylene glycol, trimethylol propane, and the like; lower-alkoxy-lower alkanols, e.g., the methyl, ethyl, propyl, and butyl monoethers of the above glycols; lower polyoxyalkylene glycols, e.g., diethylene glycol, dipropylene glycol, triethylene glycol, and the like; and mono-lower-alkoxy ethers of lower polyoxyalkylene glycols, e.g., the methyl, ethyl, propyl, and butyl monoethers of the above polyoxyalkylene glycols.

Although as discussed above, substantially all primary and secondary amines can be used in the novel process of this invention, said process is epecially useful in the production of 2,2-diarylacetamides of the formula:

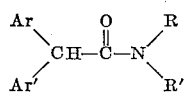

wherein Ar and Ar' are aryl and wherein R and R' are selected from the group consisting of hydrogen, alkyl, alkenyl, alkynyl, cycloalkyl, aryl, aralkyl, alkoxyalkyl, dialkylaminoalkyl, aryloxyalkyl, and alkylene joined together by a bridge selected from the group consisting of methylene, oxygen, and sulfur, with the provisos that R and R' are not both aryl, that R and R' are not both hydrogen, and that when R is alkylene, R' is also alkylene. Ar and Ar' can be alike or different. Except for the above provisos, R and R' can be alike or different.

Examples of alkyl are methyl, ethyl, propyl, butyl, pentyl, hexyl, heptyl, octyl, nonyl, decyl, undecyl, dodecyl, and isomeric forms thereof. Examples of alkenyl are allyl, 1-methylallyl, 2-methylallyl (methallyl), 2-butenyl (crotyl), 3-butenyl, 1,2-dimethylallyl, 2-ethylallyl, 1-methyl-2-butenyl, 2-methyl-2-butenyl, 3-methyl-2-butenyl, 3-pentenyl, 2,3-dimethyl-2-butenyl, 1,3-dimethyl-2-butenyl, 1-ethyl-2-butenyl, 4-methyl-2-pentenyl, 5-hexenyl, 3-heptenyl, 4-octenyl, 10-dodecenyl, and the like. Examples of alkynyl are 2-propynyl (propargyl), 1-methyl-2-propynyl, 2-butynyl, 3-butynyl, 1-methyl-2-butynyl, 3-pentynyl, 1,2-dimethyl-3-butynyl, 4-pentynyl, 3-hexynyl, 7-octynyl, and the like. Examples of cycloalkyl are cyclopropyl, cyclobutyl, cyclopentyl, cyclohexyl, cycloheptyl, cyclooctyl, and the like, as well as the corresponding alkyl substituted moieties. Examples of aryl include those given above. Examples of aralkyl are benzyl, phenethyl, 1-phenylethyl, 3-phenylpropyl, 4-phenylbutyl, 1-naphthylmethyl, 2-(2-naphthyl)-ethyl, and the like. Examples of alkoxyalkyl are 2-methoxyethyl, 3-methoxypropyl, 2-butoxypropyl, 4-decoxybutyl, and the like. Examples of dialkylaminoalkyl include 2-dimethylaminoethyl, 2-dibutylaminoethyl, 4-diethylaminobutyl, 10-dimethylaminodecyl, and the like. Examples of aryloxyalkyl are 2-phenoxyethyl, 4-phenoxybutyl, 3-p-tolyloxypropyl, 2-p-chlorophenoxyethyl, 5-(1-naphthyloxy)pentyl, and the like. Examples of alkylene have the following structural formulas: —CH$_2$—, —CH$_2$CH$_2$—, —CH(CH$_3$)—, —CH$_2$CH$_2$CH$_2$—, —CH$_2$CH(CH$_3$)—, —CH$_2$CH(CH$_3$)CH$_2$—, —CH$_2$CH$_2$CH$_2$CH$_2$—, —CH$_2$CH(CH$_3$)CH(CH$_3$)—, —CH$_2$CH$_2$CH$_2$CH$_2$CH$_2$—, and the like. Examples of moieties including the nitrogen in Formula I where R and R' are alkylene joined together by a bridge selected from the group consisting of methylene, oxygen, and sulfur are 1-azetidinyl, 1-pyrrolidinyl, piperidino, 1-azepinyl, morpholino, thiamorpholino, and the like, as well as the corresponding alkyl substituted moieties.

Primary and secondary amines which can be used as reactants in the novel process of this invention are either known in the art or can be prepared by methods known in the art.

The reactants, 1,1-diaryl-2,2,2-trihaloethanes and 1,1-diaryl-2,2-dihaloethylenes, are also either known in the art or can be prepared by methods known in the art.

The novel process of this invention is carried out by mixing the 1,1-diaryl-2,2,2-trihaloethane or 1,1-diaryl-2,2-dihaloethylene, the amine, and the base. Although it appears that the trihaloethane or dihaloethylene and the amine react in equimolecular ratio, an excess of either reactant can be used. It is often preferred to use an excess of the amine, for example, about 1.5 to 4 or even more moles of amine per mole of the trichloroethane or dichloroethylene, especially when the amine has a relatively low boiling point and is likely to be lost from the reaction mixture by accidental evaporation.

At least three equivalents of the base are used for each molecular equivalent of a 1,1-diaryl-2,2,2-trihaloethane. At least two equivalents of the base are used for each molecular equivalent of a 1,1-diaryl-2,2-dihaloethylene. If the aryl moieties contain substituents reactive with a base, for example, a carboxyl substituent, the equivalent amount of additional base should be used. Usually, it is preferred to use an excess of base, for example about twice to four times the maximum amount. A larger excess can be used but usually is not necessary.

Of the several types of bases mentioned above, the alkali metal alcoholates are preferred. Of those, the sodium alcoholates are especially preferred because they are relatively inexpensive and easily produced, and because they are of particularly suitable reactivity in the novel process of this invention. Also especially preferred are alkali metal alcoholate derived from diethylene glycol.

The base, amine, and 1,1-diaryl-2,2,2-trihaloethane or 1,1-diaryl-2,2-dihaloethylene can be mixed in any order. Although a diluent is not essential, especially when the reaction mixture is homogeneous at the reaction temperature, it is preferred to use a liquid diluent. Suitable diluents are those which remain liquid at the heating temperature and which are sufficiently unreactive with the reactants to be recoverable substantially unchanged after the desired reaction is complete. Preferred diluents are organic hydroxylic liquids, especially those corresponding to the above preferred alcoholates. It is often convenient to mix the base and the diluent, and then to add the amine and the dihaloethylene or trihaloethane in that order. If the base is not an alcoholate, it is sometimes advantageous to mix the diluent with a relatively concentrated aqueous solution of the base. Although amide is produced when water is present in the reaction mixture, substantially higher yields of amide are usually obtained when water is absent. Therefore, it is generally preferred to remove any water from the mixture of base and diluent, for example, by distillation, before adding the other reactants, and to maintain the reaction mixture in substantially anhydrous condition throughout the heating period.

When the base is an alcoholate, the alcohol moiety can be different or, preferably, can correspond to the alcohol used as a diluent. In either event, the alcoholate can be pre-formed or it can be formed in the reaction flask by mixing the metal, or the corresponding metal hydride or metal alkyl, with at least an equivalent amount of the appropriate alcohol until reaction is complete. Diluent and the other two reactants are then added. An especially advantageous procedure involves mixing the metal, metal hydride, or metal alkyl with an excess of one of the preferred hydroxylic diluents, the latter thus acting both as a source of the alcoholate moiety of the base and as a diluent.

The amount of diluent is not critical, sufficient being used to provide a reaction mixture which is readily agitated. Usually it is satisfactory to use about 500 to about 1500 ml. of diluent per mole of the trihaloethane or dihaloethylene.

After all reactants and diluent, if one is used, have been combined, the reaction mixture is heated in the range about 100° to about 250° C. for about 2 to about 50 hours. At temperatures below 100° C., the reaction usually proceeds at an inconveniently slow rate. Ordinarily, there is no need to heat above 250° C., and undesirable decomposition of the reactants or the desired amide may occur at the higher temperatures. A temperature range about 140° to about 210° C. is usually preferred. It is often advantageous to agitate the reaction mixture during heating. To minimize loss of relatively volatile diluents and mine reactants, it is advantageous to carry out the reaction in a sealed vessel, for example, a metal autoclave.

Amides produced by the novel process of this invention are usually solids which are only slightly soluble in water. An amide can often be separated advantageously from water-soluble by-products by cooling the total final reaction mixture, mixing with water, and isolating undissolved amide by filtration or centrifugation. The amount of water is not critical. About 1 to about 10 liters of water per mole of expected amide is usually satisfactory although more or less can be used. If a particular amide has a sufficient solubility in water, less water should be used and the water should be cold. It is also sometimes advantageous to extract the resulting water solution with an immiscible liquid of moderate polarity, e.g., diethyl ether, to recover amide which may escape the filtration or centrifugation, or which may be dissolved in the water. Alternatively, the amide can be isolated from the total final reaction mixture by extraction with a liquid of moderate polarity, e.g., diethyl ether or chloroform, followed by evaporation of said liquid.

The isolated amide can be purified by conventional techniques, for example, trituration with non-polar solvents to remove unreacted starting materials, recrystallization from a suitable solvent or mixture or solvents, distillation, chromatography, or a combination of those techniques.

The novel process of this invention can be more fully understood by the following examples.

*Example 1.—2,2-diphenyl-N,N-dimethylacetamide*

Sodium metal (3.5 g.; 0.15 gram atom) was added to 65 ml. of diethylene glycol, and the resulting solution was cooled to about 0° C. Gaseous dimethylamine (4.5 g.; 0.10 mole) was dissolved in the solution, and the whole was mixed with 1,1-diphenyl-2,2-dichloroethylene (12.5 g.; 0.05 mole) in a 150-ml. stainless steel autoclave cooled to about 0° C. The autoclave was closed and heated in the range 150° to 160° C. for 18 hours with occasional shaking. The pressure in the autoclave ranged from 40 to 60 p.s.i.g.

After cooling to about 90° C., the autoclave was opened and its contents poured with vigorous stirring into 300 ml. of water at about 0° C. The autoclave was rinsed with 25 ml. of ethanol, the rinsing being added to the mixture of water and product. After further stirring, the solid became crystalline. The solid was then filtered, air-dried, and triturated with three 50-ml. portions of ligroin. Further air-drying gave 6.9 g. of 2,2-diphenyl-N,N-dimethylacetamide; M.P. 133° C.

The combined ligroin solutions were evaporated to give 2.3 g. of unreacted 1,1-diphenyl-2,2-dichloroethylene.

Following the above procedure but using in separate runs, tetramethylene glycol and the monomethyl ether of diethylene glycol in place of the diethylene glycol, similar yields of 2,2-diphenyl-N,N-dimethylacetamide were obtained.

*Example 2.—2,2-diphenyl-N,N-dimethylacetamide*

Following the procedures of Example 1 but using sodium hydroxide (4.0 g.; 0.10 mole) in place of sodium metal and heating at about 155° C. for 4 hours, there was obtained a slightly smaller yield of 2,2-diphenyl-N,N-dimethylacetamide.

*Example 3.—2,2-diphenyl-N,N-dimethylacetamide*

A solution of 75 g. of diethylene glycol and 16.0 g. of 50 percent aqueous sodium hydroxide solution (equivalent to 0.2 mole sodium hydroxide) was distilled at 150° C. and 25 to 30 mm. pressure until about 27 g. of distillate had been collected. The undistilled anhydrous residue solidified in the range 75° to 80° C. This residue was placed in a stainless steel autoclave with 1,1-diphenyl-2,2,2-trichloroethane (14.3 g.; 0.05 mole) and a solution of dimethylamine (5.3 g.; 0.10 mole) in 10 ml. diethylene glycol. The autoclave was closed and heated with agitation at about 145° C. for 45 minutes and then at about 175° C. for 5½ hours. The autoclave was cooled and its contents were poured into 250 ml. of water at about 0° C. When the resulting precipitate solidified, it was filtered, washed with water, air-dried, triturated with ligroin, and again air-dried to give 6.2 g. of 2,2-diphenyl-N,N-dimethylacetamide.

*Example 4.—2,2-diphenyl-N,N-dimethylacetamide*

Sodium metal (4.6 g.; 0.20 gram atom) was added to 60 ml. of diethylene glycol. The resulting solution was cooled and rinsed into an ice-cooled stainless steel autoclave with an additional 5 ml. of diethylene glycol. A solution of dimethylamine (4.5 g.; 0.10 mole) in 10 ml. of diethylene glycol, and 1,1-diphenyl-2,2,2-trichloroethane (14.3 g.; 0.05 mole) were added. The autoclave was closed, and heated with agitation at about 100° C. for 45 minutes and then in the range 170° to 175° C. for 3 hours. The autoclave was cooled and opened, and 4.9 g. of 2,2-diphenyl-N,N-dimethylacetamide was isolated as in Example 3.

*Example 5.—2,2-diphenyl-N,N-dimethylacetamide*

A solution of 60 ml. of diethylene glycol and 12.0 g. of 50 percent aqueous sodium hydroxide solution was distilled at reduced pressure until about 10 g. of distillate had been collected. The resulting anhydrous residue was placed in a stainless steel autoclave with a solution of dimethylamine (4.5 g.; 0.10 mole) in 10 ml. of diethylene glycol, and 1,1-diphenyl-2,2-dichloroethylene (12.5 g.; 0.05 mole). The autoclave was closed and heated at 165° C. for 5 hours with agitation. After cooling to about 100° C., the clear liquid product was decanted out of the autoclave and cooled with stirring to 10° C. The crystalline slurry which formed was filtered to give 3.5 g. of white solid. The infrared spectrum of a chloroform extract of this solid was substantially identical with that of pure 2,2-diphenyl-N,N-dimethylacetamide.

*Example 6.—2,2-diphenyl-N-butylacetamide*

Sodium metal (3.5 g.; 0.15 gram atom) was dissolved in 60 ml. of diethylene glycol. The resulting solution was cooled and placed in a stainless steel autoclave with butylamine (7.3 g.; 0.10 mole) and 1,1-diphenyl-2,2-dichloroethylene (12.5 g.; 0.05 mole). The autoclave was closed and heated at about 155° C. for 18 hours. After cooling, the product was poured into about 250 ml. of water at about 0° C. The resulting precipitate was filtered, dried, triturated with ligroin, and dried again to give 7.2 g. of 2,2-diphenyl-N-butylacetamide; M.P. 89–92° C.

*Example 7.—2,2-diphenyl-N-p-tolylacetamide*

Following the procedure of Example 6 but using in place of the butylamine, p-toluidine (10.7 g.; 0.10 mole), there was obtained 2.35 g. of 2,2-diphenyl-N-p-tolylacetamide in the form of a white solid; M.P. 171–173° C.

*Example 8.—1-(diphenylacetyl)piperidine*

Following the procedure of Example 6 but using in place of the butylamine, piperidine (8.5 g.; 0.10 mole), there was obtained 6.4 g. of 1-(diphenylacetyl)piperidine; M.P. 116–117° C.

*Example 9.—2,2-bis(o-chlorophenyl)-N,N-diethylacetamide*

Following the procedure of Example 3, diethylamine (7.3 g.; 0.10 mole) was reacted with 2,2-bis(o-chlorophenyl)-1,1,1-trichloroethane (17.7 g.; 0.05 mole) to produce 2,2-bis(o-chlorophenyl)-N,N-diethylacetamide.

*Example 10.—2,2-bis(p-methoxyphenyl)-N,N-dihexylacetamide*

Following the procedure of Example 1, dihexylamine (18.5 g.; 0.10 mole) was reacted with 2,2-bis(p-methoxyphenyl)-1,1-dichloroethylene (15.5 g.; 0.05 mole) to give 2,2-bis(p-methoxyphenyl-N,N-dihexylacetamide.

*Example 11.—2,2-diphenyl-N,N-diallylacetamide*

Following the procedure of Example 1, diallylamine (9.7 g.; 0.10 mole) was reacted with 1,1-diphenyl-2,2-dichloroethylene (12.5 g.; 0.05 mole) to give 2,2-diphenyl-N,N-diallylacetamide.

*Example 12.—2,2-bis-(1-naphthyl)-N-methyl-N-phenylacetamide*

Following the procedure of Example 3, N-methylaniline (10.7 g.; 0.10 mole) was reacted with 2,2-bis(1-naphthyl)-1,1,1-trichloroethane (19.3 g.; 0.05 mole) and potassium hydroxide (11.2 g.; 0.20 mole) in 75 ml. of butanol to give 2,2-bis-(1-naphthyl)-N-methyl-N-phenylacetamide.

*Example 13.—2,2-bis(2-naphthyl)-N,N-dicyclohexylacetamide*

Following the procedure of Example 3, dicyclohexylamine (18.1 g.; 0.10 mole) was reacted with 2,2-bis(2-naphthyl)-1,1,1-trichloroethane (19.3 g.; 0.05 mole) to give 2,2-bis(2-naphthyl)-N,N-dicyclohexylacetamide.

*Example 14.—2,2-di-4-pyridyl-N,N-dibenzylacetamide*

Following the procedure of Example 1, dibenbzylamine (19.7 g.; 0.10 mole) was reacted with 2,2-di-4-pyridyl-1,1-dibromoethylene (16.8 g.; 0.05 mole) to give 2,2-di-4-pyridyl-N,N-dibenzylacetamide.

*Example 15.—2,2-di-2-furyl-N-methyl-N-propargylacetamide*

Following the procedure of Example 3, methylpropargylamine (6.9 g.; 0.10 mole) was reacted with 2,2-di-2-furyl-1,1,1-trichloroethane (13.3 g.; 0.05 mole) to give 2,2-di-2-furyl-N-methyl-N-propargylacetamide.

*Example 16.—2,2-di-2-thienyl-N,N-bis(2-methoxyethyl)acetamide*

Following the procedure of Example 1, bis(2-methoxyethyl)amine (13.3 g.; 0.10 mole) was reacted with 2,2-di-2-thienyl-1,1-dichloroethylene (13.05 g.; 0.05 mole) to give 2,2-di-2-thienyl-N,N-bis(2-methoxyethyl)acetamide.

*Example 17.—1-(di-p-tolylacetyl)pyrrolidine*

Following the procedure of Example 1, pyrrolidine (7.1 g.; 0.10 mole) was reacted with 2,2-di-p-tolyl-1,1-dichloroethylene (13.85 g.; 0.05 mole) to give 1-(di-p-tolylacetyl)pyrrolidine.

*Example 18.—4-[di-(m-fluorophenyl)acetyl]morpholine*

Following the procedure of Example 1, morpholine (8.7 g.; 0.10 mole) was reacted with 2,2-bis(m-fluorophenyl)-1,1-dichloroethylene (14.25 g.; 0.05 mole) to give 4-[di-(m-fluorophenyl)-acetyl]morpholine.

*Example 19.—1,4-bis[di(4-quinolyl)acetyl]piperazine*

Following the procedure of Example 3, piperazine (8.6 g.; 0.10 mole) was reacted with 2,2-bis(4-quinolyl)-1,1,1-trichloroethane (77.5 g.; 0.20 mole) to give 1,4-bis[di(4-quinolyl)acetyl]piperazine.

*Example 20.—N,N'-ethylenebis[N-methyl-2,2-diphenylacetamide]*

Following the procedure of Example 1, N,N'-dimethylethylenediamine (8.8 g.; 0.10 mole) was reacted with 2,2-diphenyl-1,1-dichloroethylene (50.0 g.; 0.20 mole) to give N,N'-ethylenebis-[N-methyl-2,2-diphenylacetamide].

*Example 21.—N,N'-tetramethylenebis[2,2-di-p-chlorophenylacetamide]*

Following the procedure of Example 1, 1,4-butanediamine (8.8 g.; 0.10 mole) was reacted with 2,2-bis(p-chlorophenyl)-1,1-dichloroethylene (63.6 g.; 0.20 mole) to give N,N'-tetramethylenebis[2,2-di-p-chlorophenylacetamide].

*Example 22.—2,2-bis(p-tert-butylphenyl)-N-(3-diethylaminopropyl)acetamide*

Following the procedure of Example 1, N,N-diethyl-1,3-propanediamine (13.0 g.; 0.10 mole) was reacted with 2,2-bis(p-tert-butylphenyl)-1,1-dichloroethylene (18.05 g.; 0.05 mole) to give 2,2-bis(p-tert-butylphenyl)-N-(3-diethylaminopropyl)acetamide.

We claim:
1. A process for producing a 2,2-di(Ar)-N,N-disubstituted acetamide, wherein Ar is selected from the group consisting of unsubstituted aryl and alkyl-, alkenyl-, alkoxy-, alkylthio- and halo-substituted aryl, which comprises reacting, at a temperature within the range of about 100° C. to about 250° C., a secondary amine, a polyhalo member selected from the group consisting of 1,1-di(Ar)-2,2,2-trihaloethanes and 1,1-di(Ar)-2,2-dihaloethylenes wherein Ar is as defined above, and a base selected from the group consisting of quaternary ammonium hydroxides, alkali metal hydroxides, and alcoholates of alkali metals, alkaline earth metals, and aluminum, wherein said base is employed in an amount of at least one equivalent per halo atom in said polyhalo member.

2. The process of claim 1 wherein said 1,1-di(Ar)2,2,2-trihaloethanes and said 1,1-di(Ar)-2,2-dihaloethylenes are 1,1-di(Ar)-2,2,2-trichloroethanes and 1,1-di(Ar)-2,2-dichloroethylenes, respectively.

3. A process for producing a 2,2-di(Ar)-N-substituted acetamide, wherein Ar is selected from the group consisting of unsubstituted aryl and alkyl-, alkenyl-, alkoxy-, alkylthio- and halo-substituted aryl, which comprises reacting, at a temperature within the range of about 100° C. to about 250° C, a primary amine, a polyhalo member selected from the group consisting of 1,1-di(Ar)-2,2,2-trihaloethanes and 1,1-di(Ar)-2,2-dihaloethylenes wherein Ar is as defined above, and a base selected from the group consisting of quaternary ammonium hydroxides, alkali metal hydroxides, and alcoholates of alkali metals, alkaline earth metals, and aluminum wherein said base is employed in an amount of at least one equivalent per halo atom in said polyhalo member.

4. The process of claim 3 wherein said 1,1-di(Ar)-2,2,2-trihaloethanes and said 1,1-di(Ar)-2,2-dihaloethylenes are 1,1-di(Ar)-2,2,2-trichloroethanes and 1,1-di(Ar)-2,2-dichloroethylenes, respectively.

5. A process for producing a 2,2-di(Ar)-N,N-di-substituted acetamide, wherein Ar is selected from the group consisting of unsubstituted aryl and alkyl-, alkenyl-, alkoxy-, alkylthio- and halo-substituted aryl, which comprises the steps: (1) reacting, at a temperature within the range of about 100° C. to about 250° C., a secondary amine, a polyhalo member selected from the group consisting of 1,1-di(Ar)-2,2,2-trihaloethanes and 1,1-di(Ar)-2,2-dihaloethylenes wherein Ar is as defined above, and a base selected from the group consisting of quaternary ammonium hydroxides, alkali metal hydroxides, and alcoholates of alkali metals, alkaline earth metals, and aluminum wherein said base is employed in an amount of at least one equivalent per halo atom in said polyhalo member and (2) contacting the reaction mixture resulting from step (1) with water.

6. The process of claim 5 wherein said 1,1-di(Ar)2,2,2-trihaloethanes and said 1,1-di(Ar)-2,2-dihaloethylenes are 1,1-di(Ar)-2,2,2-trichloroethanes and 1,1-di(Ar)-2,2-dichloroethylenes, respectively.

7. A process for producing a 2,2-di(Ar)-N-substituted acetamide, wherein Ar is selected from the group consisting of unsubstituted aryl and alkyl-, alkenyl-, alkoxy-, alkylthio- and halo-substituted aryl, which comprises the steps: (1) reacting, at a temperature within the range of about 100° C. to about 250° C., a primary amine, a polyhalo member selected from the group consisting of 1,1-di(Ar)-2,2,2-trihaloethanes and 1,1-di(Ar)-2,2-dihaloethylenes wherein Ar is as defined above, and a base selected from the group consisting of quaternary ammonium hydroxides, alkali metal hydroxides, and alcoholates of alkali metals, alkaline earth metals, and aluminum wherein said base is employed in an amount of at least one equivalent per halo atom in said polyhalo member and (2) contacting the reaction mixture resulting from step (1) with water.

8. The process of claim 7 wherein said 1,1-di(Ar)-2,2,2-trihaloethanes and said 1,1-di(Ar)-2,2-dihaloethylenes are 1,1-di(Ar)-2,2,2-trichloroethanes and 1,1-di(Ar)-2,2-dichloroethylenes, respectively.

9. A process for producing an acetamide of the formula:

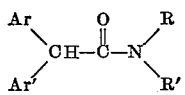

wherein Ar and Ar' are selected from the group consisting of unsubstituted aryl and alkyl-, alkenyl-, alkoxy-, alkylthio- and halo-substituted aryl, and wherein R and R' are selected from the group consisting of hydrogen, alkyl from 1 to 12 carbon atoms, inclusive, alkenyl from 3 to 12 carbon atoms, inclusive, alkynyl from 3 to 8 carbon atoms, inclusive, cycloalkyl from 3 to 8 carbon atoms, inclusive, aryl from 6 to 18 carbon atoms, inclusive, aralkyl from 7 to 12 carbon atoms, inclusive, alkoxyalkyl from 3 to 14 total carbon atoms, inclusive, dialkylaminoalkyl from 4 to 12 total carbon atoms, inclusive, dialkylaminoalkyl from 8 to 15 total carbon atoms, inclusive, alkylene from 1 to 5 carbon atoms, inclusive, joined together by a bridge selected from the group consisting of methylene, oxygen, and sulfur, with the provisos that R and R' are not both aryl, that R and R' are not both hydrogen, and that when R is alkylene, R' is also alkylene, which comprises reacting, at a temperature within the range of about 100° C. to about 250° C., an amine of the formula:

wherein R and R' are as defined above, a polyhalo member selected from the group consisting of 1,1-di(Ar)-2,2,2-trihaloethanes and 1,1-di(Ar) - 2,2 - dihaloethylenes, wherein Ar is as above defined, and a base selected from the group consisting of quaternary ammonium hydroxides, alkali metal hydroxides, and alcoholates of alkali metals, alkaline earth metals, and aluminum wherein said base is employed in an amount of at least one equivalent per halo atom in said polyhalo member.

10. The process of claim 9 wherein Ar and Ar' are selected from the group consisting of phenyl, alkylphenyl, and halophenyl.

11. The process of claim 9 wherein said base is an alkali metal alcoholate.

12. The process of claim 11 wherein said alcoholate is derived from an alcohol selected from the group consisting of lower alkanols, lower alkylene glycols, lower-alkoxy-lower alkanols, lower polyalkylene glycols, and mono-lower-alkoxy ethers of lower polyalkylene glycols.

13. The process of claim 9 wherein said 1,1-di(Ar)-2,2,2-trihaloethanes and said 1,1-di(Ar)-2,2-dihaloethylenes are 1,1-di(Ar)-2,2,2-trichloroethanes and 1,1-di(Ar)-2,2-dichloroethylenes, respectively.

14. A process for producing an acetamide of the formula:

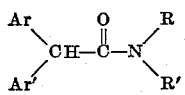

wherein Ar and Ar' are selected from the group consisting of unsubstiuted aryl and alkyl-, alkenyl-, alkoxy-, alkylthio-, and halo-substituted aryl, and wherein R and R' are selected from the group consisting of hydrogen, alkyl from 1 to 12 carbon atoms, inclusive, alkenyl from 3 to 12 carbon atoms, inclusive, alkynyl from 3 to 8 carbon atoms, inclusive, cycloalkyl from 3 to 8 carbon atoms, inclusive, aryl from 6 to 18 carbon atoms, inclusive, aralkyl from 7 to 12 carbon atoms, inclusive, alkoxyalkyl from 3 to 14 total carbon atoms, inclusive, dialkylaminoalkyl from 4 to 12 carbon atoms, inclusive, aryloxyalkyl from 8 to 15 total carbon atoms, inclusive, and alkylene from 1 to 5 carbon atoms, inclusive, joined together by a bridge selected from the group consisting of methylene, oxygen, and sulfur, with the provisos that R and R' are not both aryl, that R and R' are not both hydrogen, and that when R is alkylene, R' is also alkylene, which comprises the steps: (1) reacting, at a temperature within the range of about 100° C. to about 250° C., an amine of the formula:

wherein R and R' are as defined above, a polyhalo member selected from the group consisting of 1,1-di(Ar)-2,2,2 - trihaloethanes and 1,1 - di(Ar) - 2,2 - dihaloethylenes, wherein Ar is as above defined and a base selected from the group consisting of quaternary ammonium hydroxides, alkali metal hydroxides, and alcoholates of alkali metals, alkaline earth metals, and aluminum, wherein said base is employed in an amount of at least one equivalent per halo atom in said polyhalo member and (2) contacting the reaction mixture resulting from step (1) with water.

15. The process of claim 14 wherein Ar and Ar' are selected from the group consisting of phenyl, alkylphenyl, and halophenyl.

16. The process of claim 14 wherein said base is an alkali metal alcoholate.

17. The process of claim 16 wherein said alcoholate is derived from an alcohol selected from the group consisting of lower alkanols, lower alkylene glycols, lower- alkoxy-lower alkanols, lower polyalkylene glycols, and mono-lower-alkoxy ethers of lower polyalkylene glycols.

18. The process of claim 14 wherein said 1,1-di(Ar)-2,2,2-trihaloethanes and said 1,1-di(Ar)-2,2,2,dihaloethylenes are 1,1-di(Ar)-2,2,2-trichloroethanes and 1,1-di(Ar)-2,2-dichloroethylenes, respectively.

19. A process for producing 2,2-diphenyl-N-N-dimethylacetamide which comprises reacting, at a temperature within the range of about 100° C. to about 250° C., dimethylamine, a polychloro member selected from the group consisting of 1,1-diphenyl-2,2,2-trichloroethane and 1,1-diphenyl-2,2-dichloroethylene, and an alkali metal alcoholate wherein said alcoholate is employed in an amount of at least one equivalent per halo atom in said polychloro member.

20. The process of claim 19 wherein said alcoholate is derived from an alcohol selected from the group consisting of lower alkanols, lower alkylene glycols, lower-alkoxy-lower alkanols, lower polyalkylene glycols, and mono-lower-alkoxy ethers of lower polyalkylene glycols.

21. The process of claim 19 wherein said alkali metal alcoholate is sodium diethylene glycolate.

22. The process of claim 19 wherein said heating is carried out in the range of 140° to 210° C.

23. A process for producing 2,2-diphenyl-N,N-dimethylacetamide which comprises the steps: (1) reacting at a temperature within the range of about 100° C. to about 250° C., dimethylamine, a polychloro member selected from the group consisting of 1,1-diphenyl-2,2,2-trichloroethane and 1,1-diphenyl-2,2-dichloroethylene, and an alkali metal alcoholate, wherein said alcoholate is employed in an amount of at least one equivalent per halo atom in said polychloro member and (2) contacting the reaction mixture resulting from step (1) with water.

24. The process of claim 23 wherein said alcoholate is derived from an alcohol selected from the group consisting of lower alkanols, lower alkylene glycols, lower-alkoxy-lower alkanols, lower polyalkylene glycols, and mono-lower-alkoxy ethers of lower polyalkylene glycols.

25. The process of claim 23 wherein said alkali metal alcoholate is sodium diethylene glycolate.

26. The process of claim 23 wherein said heating is carried out in the range 140° to 210° C.

References Cited by the Examiner

Banti: Gaz. Chim. Ital., vol. 59, pp. 819–24 (1929).
Saunders et al.: Tetrahedron, vol. 11, pp. 1–10 (1960).
Webster's Third New International Dictionary, pp. 116, 120, 125, and 1108, Springfield, Mass., Merriam, 1961.

WALTER A. MODANCE, *Primary Examiner.*

N. TROUSOF, *Assistant Examiner.*

UNITED STATES PATENT OFFICE
CERTIFICATE OF CORRECTION

Patent No. 3,296,304 January 3, 1967

James N. Tilley et al.

It is hereby certified that error appears in the above numbered patent requiring correction and that the said Letters Patent should read as corrected below.

Column 4, line 7, for "maximum" read -- minimum --; column 5, line 69, for "(5.3 g.; 0.10 mole)" read -- (5.3 g.; 0.12 mole) --; column 9, lines 29 and 30, for "dialkylaminoalkyl from 8 to 15 total carbon atoms, inclusive," read -- aryloxyalkyl from 8 to 15 total carbon atoms, inclusive, --.

Signed and sealed this 26th day of September 1967.

(SEAL)
Attest:

ERNEST W. SWIDER
Attesting Officer

EDWARD J. BRENNEI
Commissioner of Patents